Dec. 18, 1951 — W. Y. HANDY ET AL — 2,579,422
METHOD AND MACHINE FOR GENERATING OFFSET FACE GEARS
Filed March 26, 1949 — 5 Sheets-Sheet 1
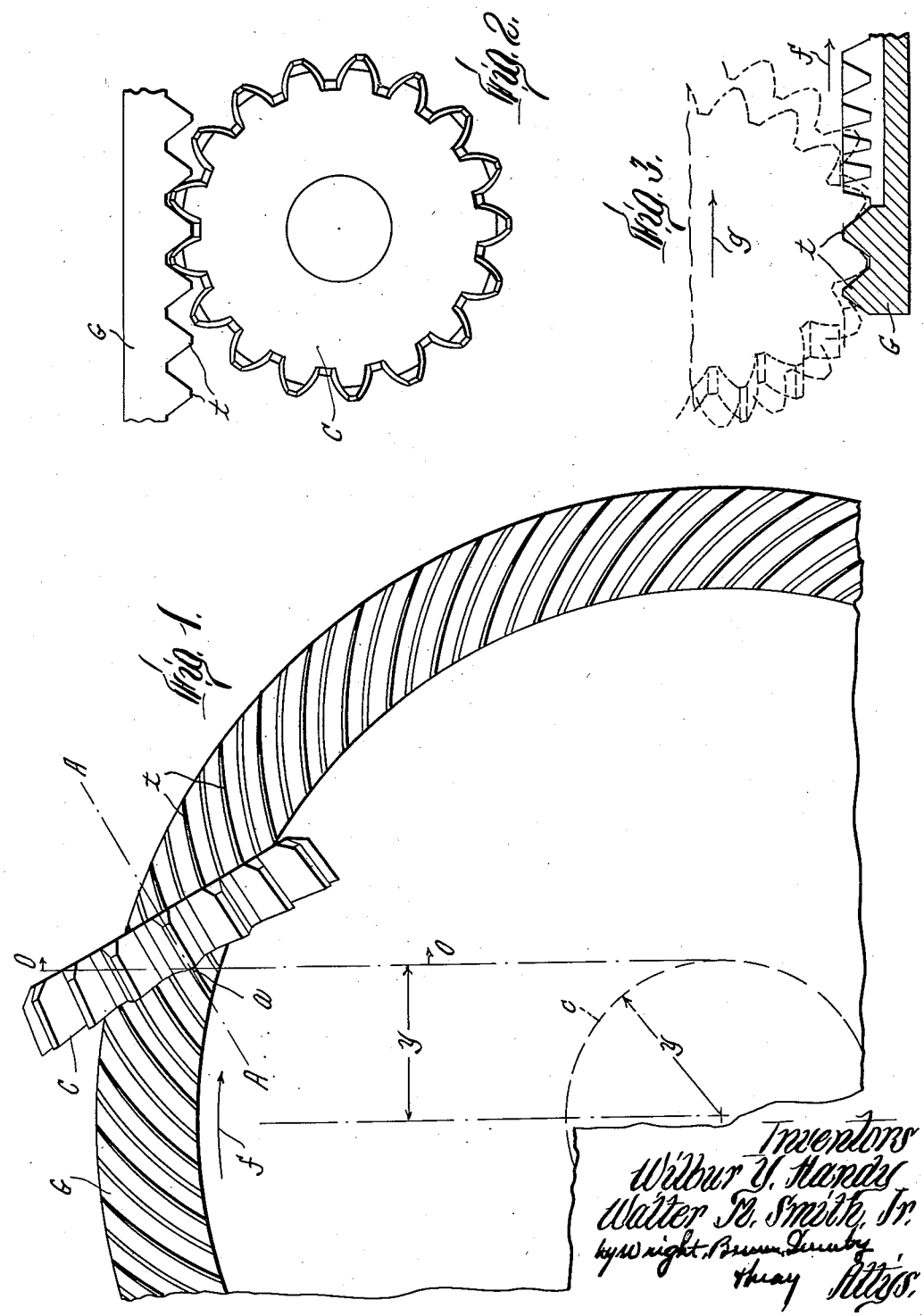

Dec. 18, 1951

W. Y. HANDY ET AL 2,579,422

METHOD AND MACHINE FOR GENERATING
OFFSET FACE GEARS

Filed March 26, 1949

Inventors
Wilbur Y. Handy
Walter M. Smith, Jr.
by Wright, Brown, Quinby & Reay
Attys.

Dec. 18, 1951 W. Y. HANDY ET AL 2,579,422
METHOD AND MACHINE FOR GENERATING
OFFSET FACE GEARS
Filed March 26, 1949 5 Sheets-Sheet 3

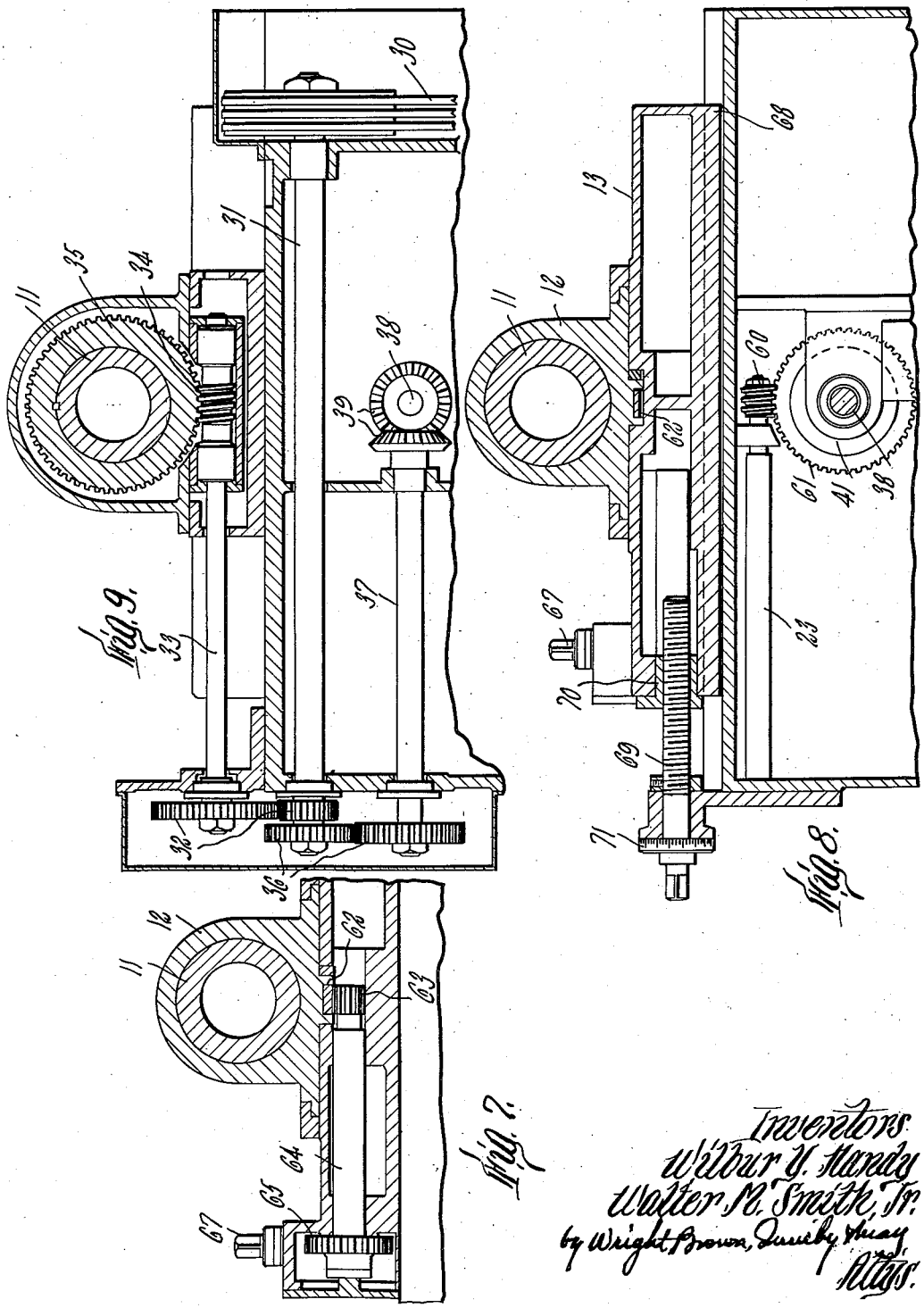

Dec. 18, 1951  W. Y. HANDY ET AL  2,579,422
METHOD AND MACHINE FOR GENERATING
OFFSET FACE GEARS
Filed March 26, 1949  5 Sheets-Sheet 5

Inventors
Wilbur Y. Handy
Walter R. Smith, Jr.
by Wright, Brown, Quimby & Imay
Attys.

Patented Dec. 18, 1951

2,579,422

UNITED STATES PATENT OFFICE 2,579,422

METHOD AND MACHINE FOR GENERATING OFFSET FACE GEARS

Wilbur Y. Handy and Walter M. Smith, Jr., Springfield, Vt., assignors to The Fellows Gear Shaper Company, Springfield, Vt., a corporation of Vermont Application March 26, 1949, Serial No. 83,646

10 Claims. (Cl. 90—1.6)

The present invention relates to the art of generating and cutting gears and is particularly concerned with producing face gears to mesh with pinions in offset arrangement. That is, a face gear of the character referred to is designed to mesh with a pinion of which the axis does not intersect the axis of the gear but lies at one side of the latter axis. Hence for the purpose of the present description face gears of the type referred to are called offset face gears.

It is the object of the invention to generate and cut such gears by means of a gear shaper cutter and by effecting a relative feeding movement between such cutter and the work piece in a path corresponding to the offset axis of a pinion to which the gear is to be made conjugate while the cutter is disposed with its axis of rotation inclined to the feeding path; the cutter and work piece being rotated at a prescribed ratio and being relatively arranged so that the cutter teeth at one side of the cutter axis project across the plane of the crests of teeth to be generated so as to cut tooth spaces progressively in the tooth zone of the work piece during a feeding traverse. Part of this object is to impart rotation of a compound nature to one of the meshing elements (cutter or work gear) of which one component corresponds to the rotation of a gear running in mesh with another gear, and the other component is an increment of angular motion corresponding to the rotation of one element when rolled without slip on its pitch circle in mesh with the other while being translated in the feeding path.

A further object is to provide a machine capable of carrying the foregoing method into effect, having provisions for producing face gears of different dimensions, different numbers of teeth and different degrees of offset; and having means by which different cutters may be mounted and adjusted to obtain results of the prescribed character.

In the following specification and accompanying drawings there are described and illustrated a face gear adapted to mesh with a helical pinion in offset relationship, the method of generatively cutting such a gear with the aid of a gear shaper cutter of spur gear characteristics, and an illustrative machine capable of use in operatively practicing the invention. This description and drawing are to be understood as illustrating the principles of the invention and not as limiting the invention to the production of face gears conjugate only to helical gears, or to the employment of spur type cutters only.

In the drawings,

Fig. 1 is a front elevation of a portion of an offset face gear with a gear shaper cutter in course of transforming a gear blank into a finished gear of the character there shown.

Fig. 2 is an end view of the cutter and a side view of a portion of the work piece as seen from the right of Fig. 1, looking in the direction of line A—A.

Fig. 3 is a fragmentary section of the face gear on a plane through the axis of the pinion with which it is designed to mesh, which plane is parallel to the axis of the gear and is indicated by line O—O of Fig. 1.

Figure 4:
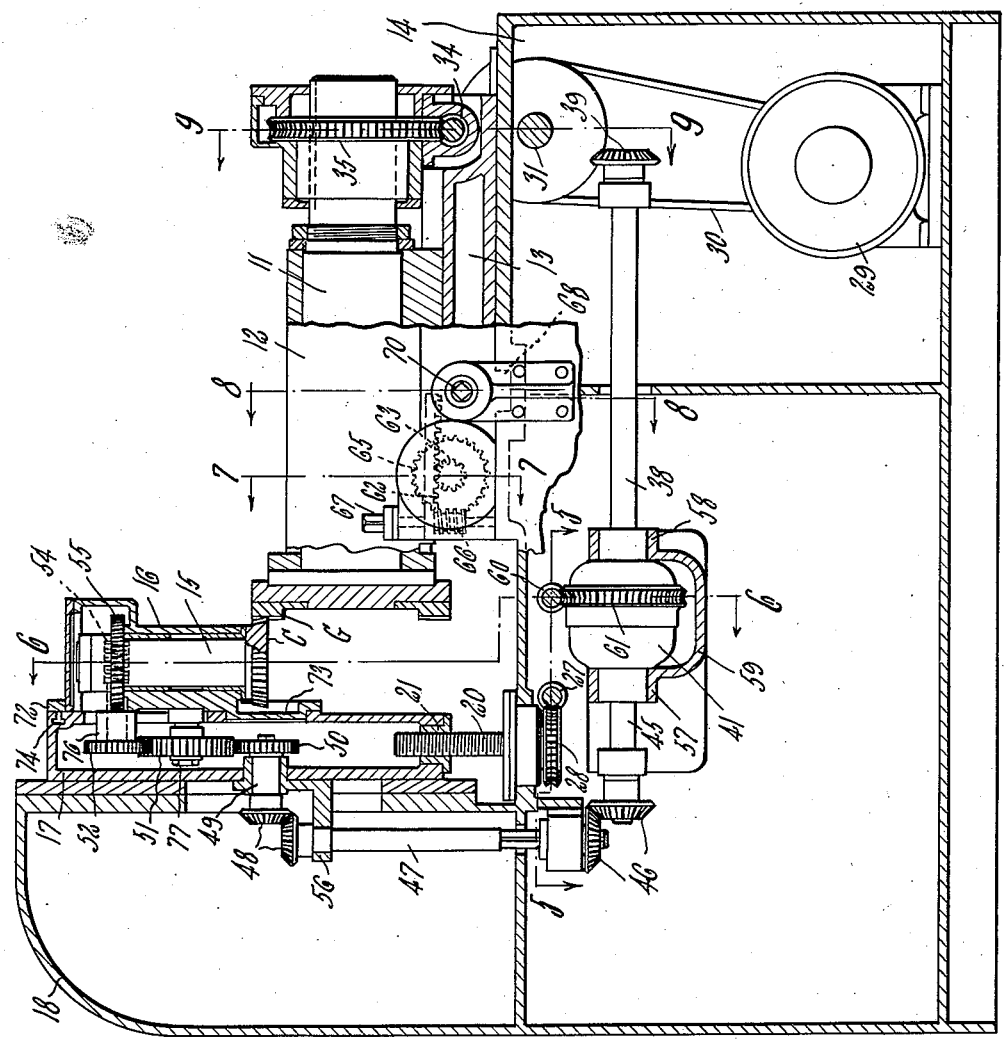
Fig. 4 is a longitudinal section and partial elevation of a machine usable to generate such a face gear, the section being taken on the broken line 4—4 of Fig. 6.
Figure 5:
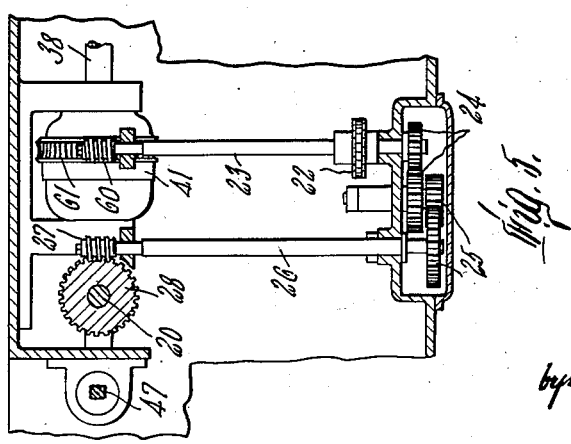
Fig. 5 is a horizontal detail section taken on line 5—5 of Fig. 4.

Figs. 6, 7, 8 and 9 are vertical cross sections taken on lines 6—6, 7—1, 8—8 and 9—9 of Fig. 4.

Figure 10:
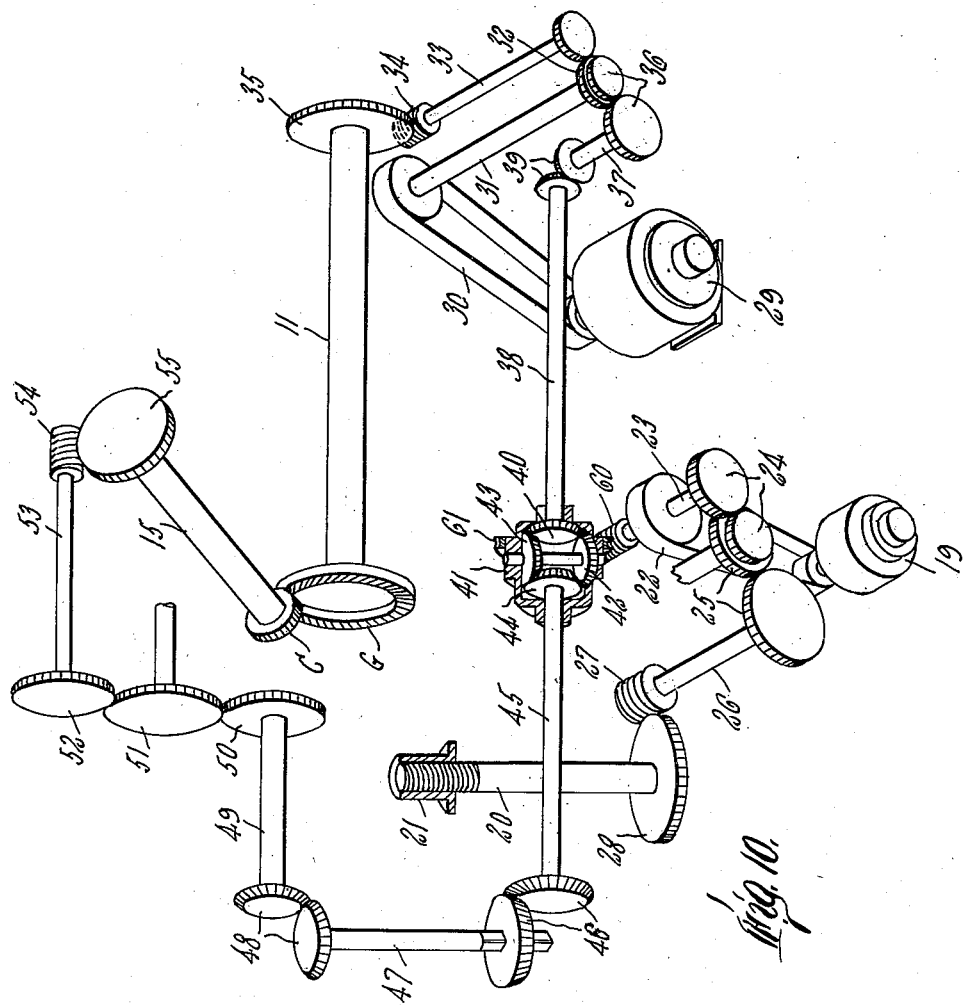

Fig. 10 is a speed and feed diagram of the machine.

Referring to Figs. 1, 2 and 3, G designates a face gear designed to mesh with a pinion on an axis O—O which is parallel to the plane of the gear and is offset a distance $y$ (which is shorter than the inner radius of the tooth bearing zone of the gear) from the axis of the gear. In other words, the pinion axis is tangent to a circumference $c$ concentric with the gear G and of which the radius is equal to the distance $y$. The teeth $t$ of the gear are inclined or skewed with respect to the radii on which they are situated and, in this particular illustration, are curved in the plane in which they lie. Such an inclined relationship, in greater or less degree, is characteristic of any face gear designed to mesh with a pinion on an offset axis.

C represents a gear shaper cutter of spur gear character which is applied according to the principles of this invention to generate and cut the teeth of the gear. The novel features of the invention reside in the manner in which, and the means whereby, such a cutter is applied for the purpose.

(In this description the term "gear shaper cutter" designates a shaping cutter having teeth arranged similarly to the teeth of a gear or pinion but provided with cutting edges at one end, and side clearance back from the end. Such cutters are well known in this art.)

In accordance with the invention, the cutter C is disposed so that the plane in which the cutting ends of its teeth lie intersects the pinion axis O—O at an oblique angle, preferably such that the cutting plane is substantially normal to the teeth of the gear, and it is rotated about its axis A—A, while the gear blank is simultaneously rotated, at a speed ratio corresponding to that of the pinion and face gear. Further, the cutter, while being thus rotated in harmony with the gear blank, is fed along the offset axial line O—O and is additionally rotated with a further component or increment, corresponding to the rotation that would be imparted to a pinion having the same number of teeth as the cutter C if transported along the line O—O in mesh with the teeth of the finished gear.

Further defining the relationship above described, the cutter is so located that the mid-point of its arc of action with the face gear lies in the plane passing through line O—O which is perpendicular to the plane of the face gear, in all positions of the feeding traverse. That point is indicated at $a$ in Fig. 1 when the cutter is at the stage of its feeding travel there represented. Otherwise defining the same relationship, the cutter is inclined at an oblique angle to a plane passing through the line O—O parallel to the axis of the face gear, and a diameter of its cutting end lies in that plane.

The component of cutter rotation corresponding to its rolling mesh with the work gear is illustrated by broken lines in Fig. 3. Assuming that a finished gear is here represented, and is held stationary, while a pinion similar to the cutter is meshed with the gear and transported along the path O—O, then the gear acts in the manner of a stationary rack to rotate the pinion. Consequently in the performance of this method a corresponding component or increment of rotation is imposed on the cutter in the course of its feeding traverse. This component may for convenience be designated the rack component, while that which corresponds to the rotation of a pinion running in mesh with the rotating face gear is called the running component. This rack component may be either in the same direction as that of the running component, in which case it is a positive increment, or in the opposite direction, when it becomes a negative increment. With the arrangement shown in these figures, where the face gear is assumed to be rotating in the direction of the arrow $f$, while the cutter is fed in the direction of arrow $g$ in Fig. 3, the rack component is a negative increment.

In the machine herein illustrated the blank to be made into the finished gear G is secured to the end of a work spindle 11 (the left end as shown in Fig. 4) which is mounted to rotate in a carrier 12. This carrier in turn is supported by a slide or carriage 13 which rests on the upper surface of a base 14.

The cutter C is secured to a cutter spindle 15 in operative relation to the gear blank, the cutter spindle being rotatably mounted in a bearing 16 attached to a carriage 17 which is connected to an upright portion 18 of the base with provision for vertical sliding movement. The side of the upright portion or post 18 facing toward the work spindle is provided with suitable guideways of known character by which the carriage 17 is held with provisions for translated movement toward and away from that part of the base on which the work holding slide 13 is mounted.

Feeding traverse is applied to the carriage 17 by feed motor 19 located in any convenient position in or outside of the base. This motor is shown only in the diagram, Fig. 10. It drives a feed screw 20, which is meshed with a nut 21 secured to the carriage 17. The driving train includes a sprocket and chain gearing 22, shaft 23, change gears 24, 25, shaft 26, worm 27 on the latter shaft, a worm wheel 28 secured to screw 20 and meshing with worm 27.

Rotation is imparted to the work spindle 11 by a drive motor 29 through sprocket and chain gear 30, shaft 31, ratio gears 32, shaft 33, and worm 34, meshing with a worm wheel 35, which is in splined connection with spindle 11.

The cutter C is rotated by the drive motor and feed motor in conjunction, with the component which has been called the running component imparted by the drive motor 29, and the rack component or incremental rotation by the feed motor 19. Shaft 31 carries one member of a pair of change gears 36, the other member of which is secured to a shaft 37. The latter shaft drives a shaft 38 through a bevel gear pair 39. To shaft 38 is connected one of the sun gears 40 of a differential gear assembly which includes a planet pinion carrier 41, planet pinions 42, 43, and a sun gear 44 on a shaft 45 aligned with shaft 38. From shaft 45 a bevel gear pair 46, shaft 47, bevel gear pair 48, shaft 49, and gears 50, 51 and 52 transmit rotation to a shaft 53 on which is mounted a worm 54 meshing with a worm wheel 55 on the cutter spindle 15.

Shaft 47 has splined engagement with one of the bevel gears 46 to permit travel of the cutter carriage. It is journaled in a bracket 56 secured to the carriage 17; and the shaft 49 is also journaled in a bearing attached to the carriage. Motor 29 is mounted in the base and all of the shafting between both motors and the shaft 37 are supported by fixed bearings in the base; the pinion carrier 41, which is constructed as a housing, having trunnions which surround the shafts 38 and 45 and rotate in bearings 57 and 58 forming part of a bracket 59.

Shaft 23, which is driven by the feed motor as previously described, carries a worm 60 in mesh with a worm wheel 61 which is secured coaxially to the planet pinion carrier 41. Thus the planet pinions 42 and 43 are revolved around the axis of sun gears 41 and 44 simultaneously with the feeding travel of the cutter carriage at a ratio which can be varied by suitable selection of the change gears 24 and 25. Any of the worms and complemental worm wheels here described may be either left-hand or right-hand as required to rotate the cutter and work gear in the prescribed direction and to give either a positive or negative increment of rolling rotation to the cutter to compensate for the direction of running rotation and feeding travel.

The work carrier and cutter spindle holder are adjustable to accommodate the work piece to cutters of different diameters, to vary the extent of offsetting of the work gear from the feeding path of the cutter, and to incline the cutter conformably to the prescribed offset of the work gear teeth.

For the first of these adjustments, the work spindle carrier 12 is guided for lengthwise movement on slide 13 and carries a rack 62 on its underside with which a pinion 63 meshes (Figs. 4 and 7). A shaft 64 extends from pinion 63 to the front of the machine where it carries a gear or worm wheel 65 with which a worm 66 meshes. The shaft of this worm has an exposed square end 67 to which a wrench can be applied for making the required adjustments. The work spindle has a splined engagement with worm wheel 35 which permits adjustments of the work carrier in this matter without deranging the driving train by which the spindle is rotated.

Slide 13 is in guided engagement with the base 14 for movement transversely of the work spindle, having a guide rib 68 occupying a channel in the top of the base. A screw 69 meshes with a nut 70 carried by the slide and is exposed at its forward end for engagement by a wrench. It carries a graduated dial 71 by which the extent of offset can be measured.

Figure 6:
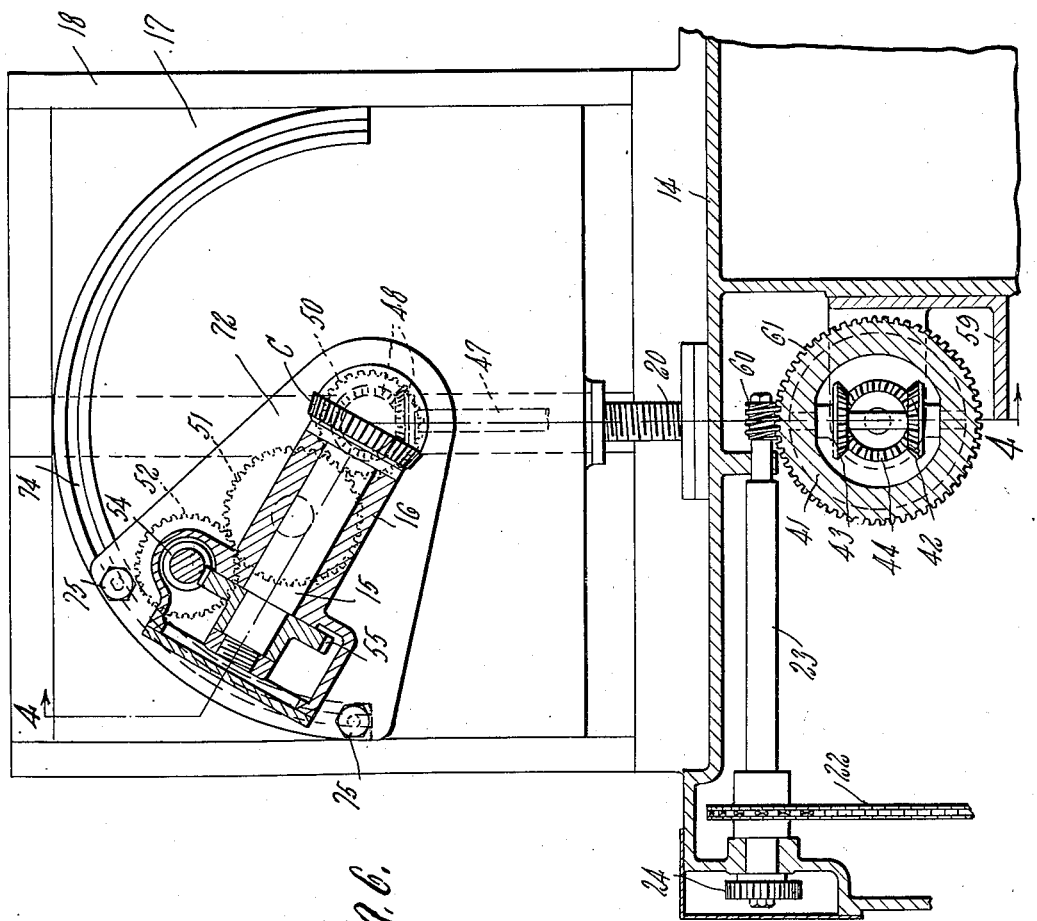

The bearing 16 for the cutter spindle forms a structural part of a sector 72 which is pivotally connected to the carriage 17 so as to turn about a horizontal axis lying in a diameter of the cutting plane of the cutter. This axis is perpendicular to the plane in which the work gear blank rotates, and coincides with the axis of shaft 49. The pivot for sector 72 is a cylindrical boss or offset 73 (Fig. 4) occupying a bearing recess in the adjacent face of the carriage 17. An undercut slot 74 is formed in the face of this carriage concentric with pivot 73 and contains the heads of clamping bolts 75 which pass through the circumferential margin of the sector 72 and serve to clamp the latter in its various positions, as shown by Fig. 6. Worm shaft 53, by which the cutter spindle is rotated, is contained in a bearing 76 which is a structural part of the sector and spindle housing, and the intermediate gear 51 is mounted on a stud 77 carried by the sector.

With the machine arrangement here shown, the operation of cutting a face gear is commenced with the cutter located outside of the circumference of the work piece. With the cutter spindle and work spindle then being rotated rapidly and the cutter carriage advanced in the prescribed path at a slow speed, the cutting action commences at the outside circumference of the rib or zone in which teeth are to be cut and progresses gradually across such rib or zone until, when the cutter passes within that zone, a complete series of teeth have been cut. The teeth may be cut to full depth in a single passage of the cutter, or in a number of passes with intermediate steps of depth feeding accomplished by moving the work carrier endwise in the manner described.

For returning the cutter to starting position after completing any cutting traverse, the depth and drive motors may be reversed, or the feed motor only reversed and the drive motor stopped. Motors capable of being so reversed are provided. If the gear is made and finished in a single traverse, and otherwise after the finishing cut has been made, the work piece can be backed off clear of the cutter by suitably turning the pinion 63 which effects endwise movement of the carrier 12.

The terms "horizontal," "vertical," and other terms of similar import, used in this description, are not limitations on the scope of the invention but have significance only insofar as they define relationships of parts. For instance, it is important that the plane of rotation of the cutter be perpendicular to that of the work piece and that the axis about which the cutter C is adjusted for angularity be in that diameter of the end plane of the cutter which is perpendicular to the work piece and that it includes the axis of one of the gears in the train which transmits rotation to the cutter. Provided that these conditions are fulfilled, the spindles and their holding and driving means may have any desired operative arrangement.

Neither is it important that the feeding travel be vertical. It may be effected in any direction provided it is transverse to the axis of the work piece and is so located that the acting teeth of the cutter are advanced in a path which is tangential to a circle concentric with the work piece and of which the radius is equal to the prescribed offset. Also the feeding travel may be performed outwardly instead of inwardly with respect to the circumference of the work piece if the cutter is mounted in reverse position on its spindle so that its cutting end plane faces upward, or outward, and lies in the axis of angular adjustment.

Variations and modifications in the transmitting mechanisms and parts thereof may be made without departing from the scope of the invention.

What I claim is:

1. A method of generating and cutting the teeth of a face gear to mesh with an offset pinion which comprises locating a gear shaper cutter with the plane of its cutting end intersecting at an oblique angle a line which corresponds to the location of such a meshing offset pinion, effecting a relative feeding traverse between the cutter and gear along the line of such offset axis and simultaneously rotating the cutter and gear blank about their respective axes with components of angular velocity corresponding respectively to the running mesh of a pinion and face gear couple and to the rolling mesh of a pinion translated along such axial line.

2. The method of generating and cutting a face gear to be conjugate with a pinion disposed with its axis offset from the axis of the face gear which comprises placing a gear shaper cutter with its cutting end face intersecting at an oblique angle a line corresponding to the axis of such a pinion and its teeth at one side projecting across the plane of the tooth-bearing zone of a gear blank located with its axis offset from the before-mentioned line by an amount equal to the prescribed offset of such a conjugate pinion, effecting a relative feeding traverse between the cutter along the said line and rotating the cutter and gear blank simultaneously with components of angular velocity corresponding respectively to the running mesh of a pinion and gear in stationary locations and the rolling mesh of a pinion transported across the tooth-bearing zone of the gear.

3. The method of generating an offset face gear which comprises effecting relative feeding traverse between a circular gear shaper cutter and a face gear blank across the zone of the blank in which teeth are to be cut along a path substantially parallel to the plane of the blank, offset from the axis of the blank by a distance less than the inner radius of such zone and so located that the cutter teeth at one side will incise the blank, maintaining the cutter continuously at an oblique angle to such path, rotating the gear blank and cutter about their respective axes at a speed ratio inversely proportional to their respective numbers of teeth and in directions corresponding to those of a face gear and pinion running in mesh but with an increment of rolling rotation applied to one of them.

4. The method of generating an offset face gear which comprises locating a circular gear shaper cutter adjacent to the zone of a face gear blank in which teeth are to be cut with its axis intersecting at an oblique angle a line substantially parallel to the face of the gear blank and offset from the axis of the blank by a distance less than the inner radius of such zone, feeding the cutter along a path which includes said line and is so located that the cutter teeth at one side will incise the blank in the course of such feeding movement and rotating the cutter and blank about their respective axes throughout the duration of the feeding traverse at harmonious speeds and in corresponding directions at the portions of each which are nearest to the other.

5. The method of generating an offset face gear which comprises locating a circular gear shaper cutter adjacent to the zone of a face gear blank in which teeth are to be cut with the end face of the cutter intersecting at an oblique angle a plane parallel to the axis of the blank which is offset from said axis by a distance less than the inner radius of said zone, a diameter of the said end then being located in said plane and the cutter being otherwise located so that its teeth at one side extend across the plane of the gear blank in which the crests of the finished teeth are to lie, effecting relative feeding traverse between the cutter and gear blank along the said plane in a path substantially parallel to the plane of the gear and simultaneously rotating the cutter and gear about their respective axes at suitable angular velocities.

6. The method of generating an offset face gear which comprises feeding a circular gear shaper cutter across the zone of a face gear blank in which teeth are to be cut, in a path which is offset from the axis of the blank and to which path the cutter is inclined at an oblique angle, rotating the blank about its axis, and simultaneously rotating the cutter at an angular velocity which is a function of the rotational speed of the blank and of the feeding speed.

7. A machine for generating face gears comprising means for holding and rotating a face gear blank, means for supporting a circular gear shaper cutter with its cutting end intersecting at an oblique angle a plane parallel to the axis of said gear-holding means which is offset from such axis a distance less than the inner radius of the zone of the gear blank in which teeth are to be cut, means for imparting a relative feeding movement between the cutter and gear blank along such plane in a path substantially parallel to the plane of the blank so located that the cutter teeth will incise the blank in the course of such traverse, and compound means for rotating the cutter-holding means at an angular velocity which is proportional both to the speed of rotation of the blank-holding means and to the speed of the feed-effecting means.

8. A face gear generating machine comprising a rotatable work holder having means for mounting a face gear blank with the plane of the blank perpendicular to the axis of the work holder, a rotatable cutter holder, a circular gear shaper cutter secured to said cutter holder, means for locating the cutter holder so that the end face of the cutter is inclined at an oblique angle to, and is intersected by, a plane parallel to the axis of the work holder offset from such axis by a distance less than the inner radius of the zone of the blank in which teeth are to be cut, and means for effecting a relative feeding traverse between the cutter holder and work holder along said plane.

9. A face gear generating machine comprising a rotatable work holder, a cutter carriage disposed for linear movement in a path transverse to the axis of the work holder, a rotatable cutter holder mounted on said carriage with its axis of rotation inclined to said path in a plane substantially perpendicular to the axis of the work holder, a gear shaper cutter coaxially mounted on said cutter holder, a means for advancing the cutter carrier in its prescribed path, means for rotating the work holder and means for rotating the cutter holder with a component of rotation proportional to the rotation of the work holder and another component proportional to the linear movement of the cutter carriage.

10. A face gear generating machine comprising a supporting structure, a work spindle rotatively mounted on said supporting structure having provisions for holding a face gear blank, a cutter carriage mounted on the supporting structure with capability for guided linear movement in a path transverse to the work spindle, a cutter spindle holder mounted on said carriage adjustable about an axis parallel to the work spindle axis, a cutter spindle rotatively mounted in said holder with its axis intersecting and perpendicular to the axis of angular adjustment of the holder, a gear shaper cutter secured coaxially on the cutter spindle with its cutting face substantially coincident with the axis of angular adjustment, means for propelling the cutter carriage in its linear path, and means for rotating both spindles simultaneously in harmony with one another including means by which an increment proportional to the linear travel of the work carriage is imparted to the cutter spindle.

WILBUR Y. HANDY.
WALTER M. SMITH, JR.

REFERENCES CITED

The following references are of record in the file of this patent:

UNITED STATES PATENTS

| Number | Name | Date |
|---|---|---|
| 982,581 | Fellows | Jan. 24, 1911 |
| 1,365,433 | Wingquist | Jan. 11, 1921 |
| 1,879,196 | Greene | Sept. 27, 1932 |
| 2,069,323 | Miller | Feb. 2, 1937 |
| 2,308,891 | Miller | Jan. 19, 1943 |